Figure 7:
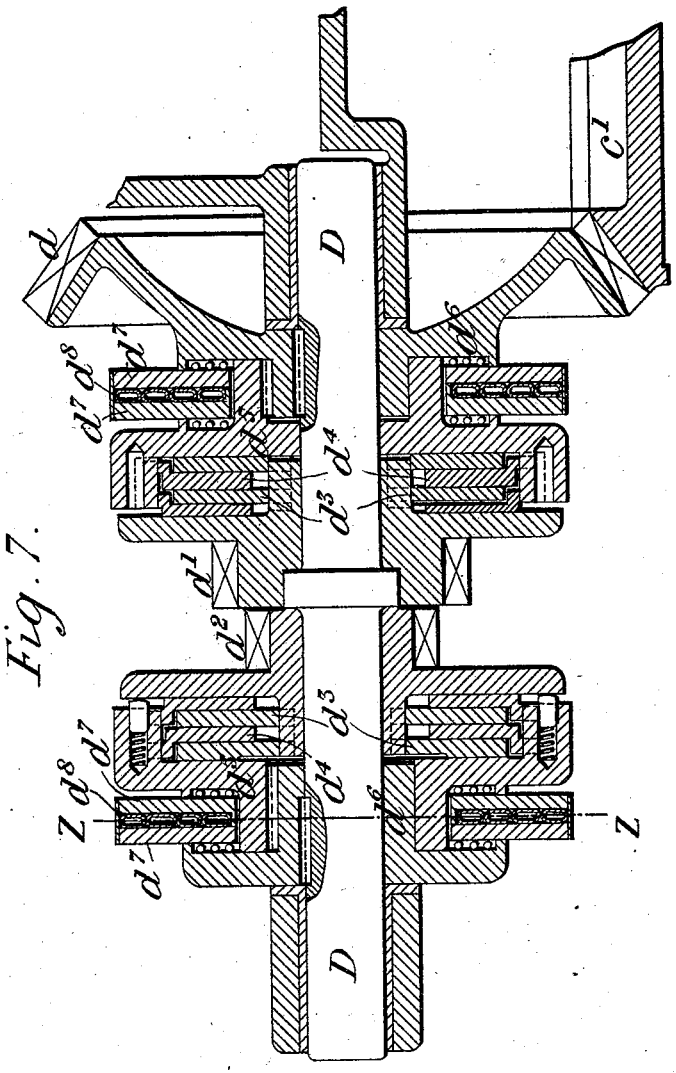

(No Model.) 6 Sheets—Sheet 1.
H. P. HOLT.
CAR PROPELLED BY GAS MOTOR ENGINE.

No. 551,637. Patented Dec. 17, 1895.

Fig. 1.

Witnesses.
Geo. W. Rea.
Robert Everett

Inventor.
Henry P. Holt.
By James L. Norris.
Atty (No Model.) 6 Sheets—Sheet 2.
H. P. HOLT.
CAR PROPELLED BY GAS MOTOR ENGINE.
No. 551,637. Patented Dec. 17, 1895.
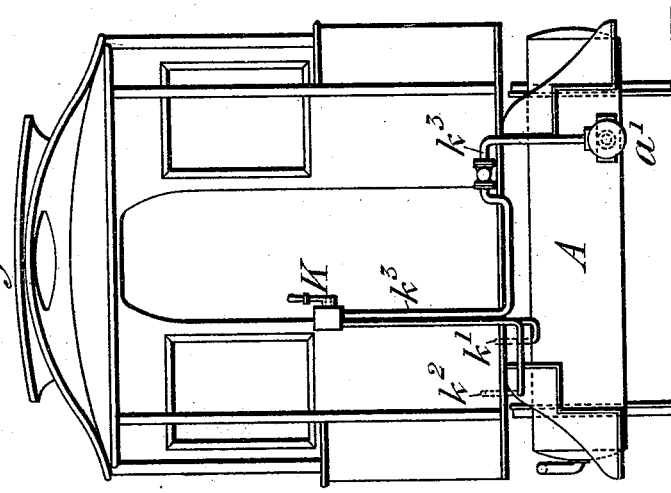
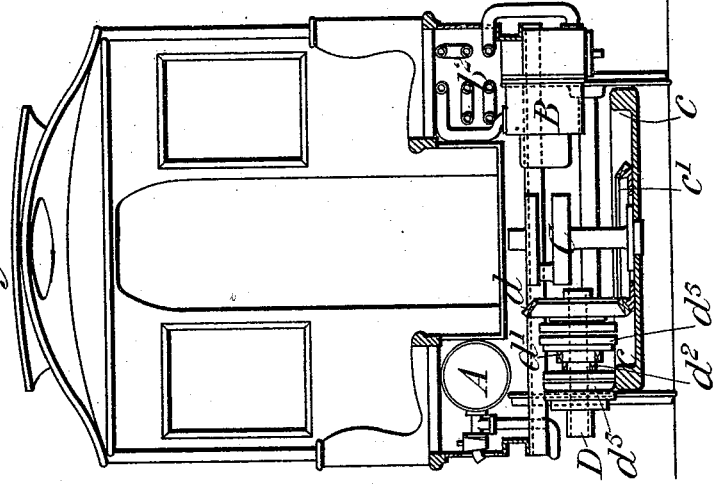
Witnesses.
Geo. W. Rea.
Robert Everett.
Inventor
Henry P. Holt.
By James L. Norris
Atty.

(No Model.) 6 Sheets—Sheet 3.
H. P. HOLT.
CAR PROPELLED BY GAS MOTOR ENGINE.
No. 551,637. Patented Dec. 17, 1895.
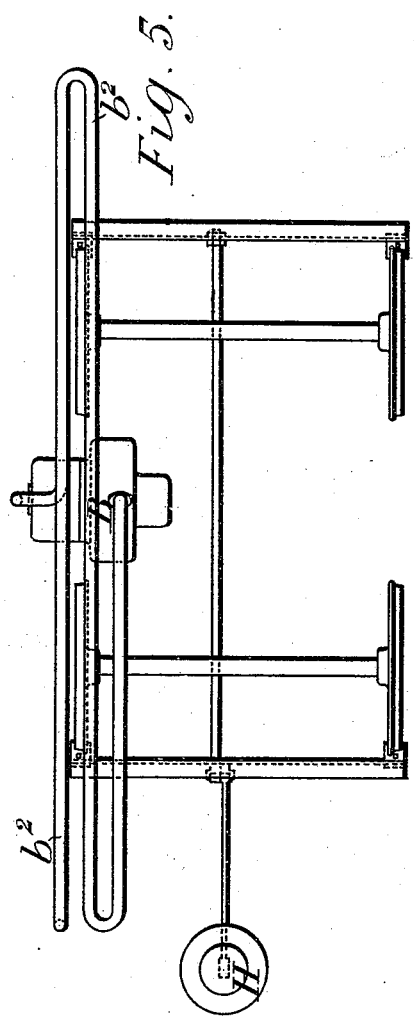
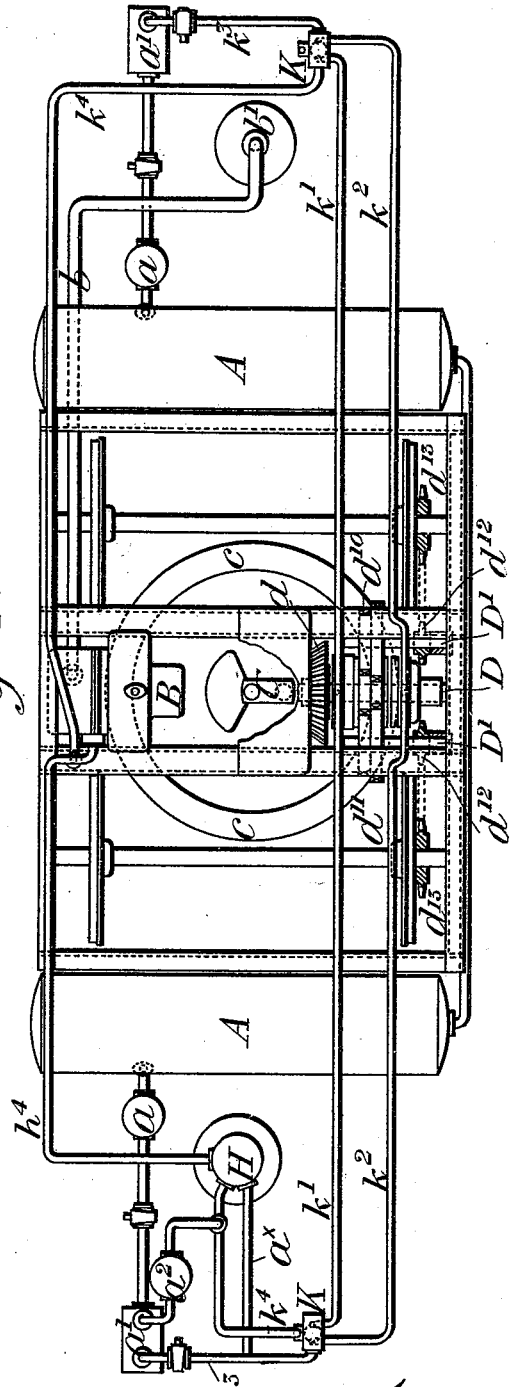
Witnesses,
Geo. W. Rea.
Robert Everett
Inventor,
Henry P. Holt.
By James L. Norris.
Atty.

(No Model.) 6 Sheets—Sheet 4.
H. P. HOLT.
CAR PROPELLED BY GAS MOTOR ENGINE.
No. 551,637. Patented Dec. 17, 1895.
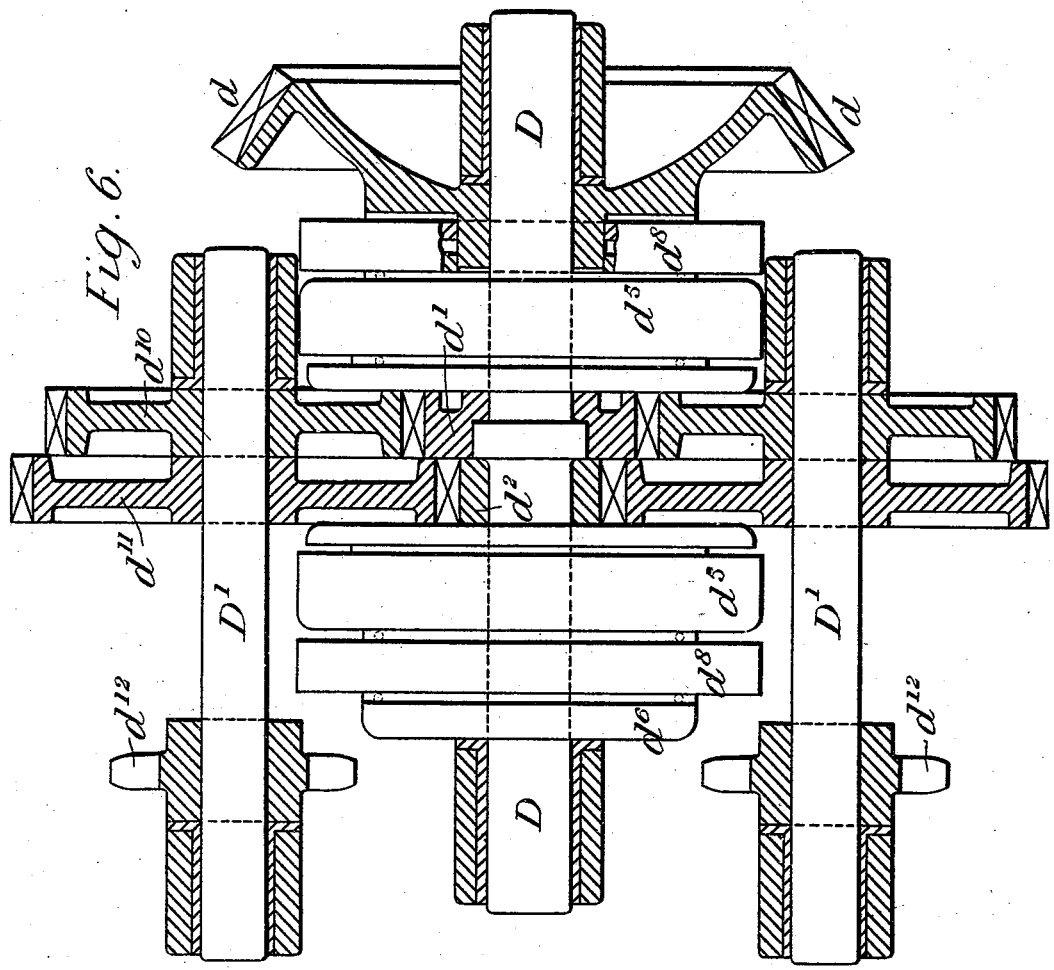

(No Model.) 6 Sheets—Sheet 5.
H. P. HOLT.
CAR PROPELLED BY GAS MOTOR ENGINE.

No. 551,637. Patented Dec. 17, 1895.

Witnesses. Inventor.
Geo. W. Rea. Henry P. Holt.
By James L. Norris.
Robert Emmett. Atty.

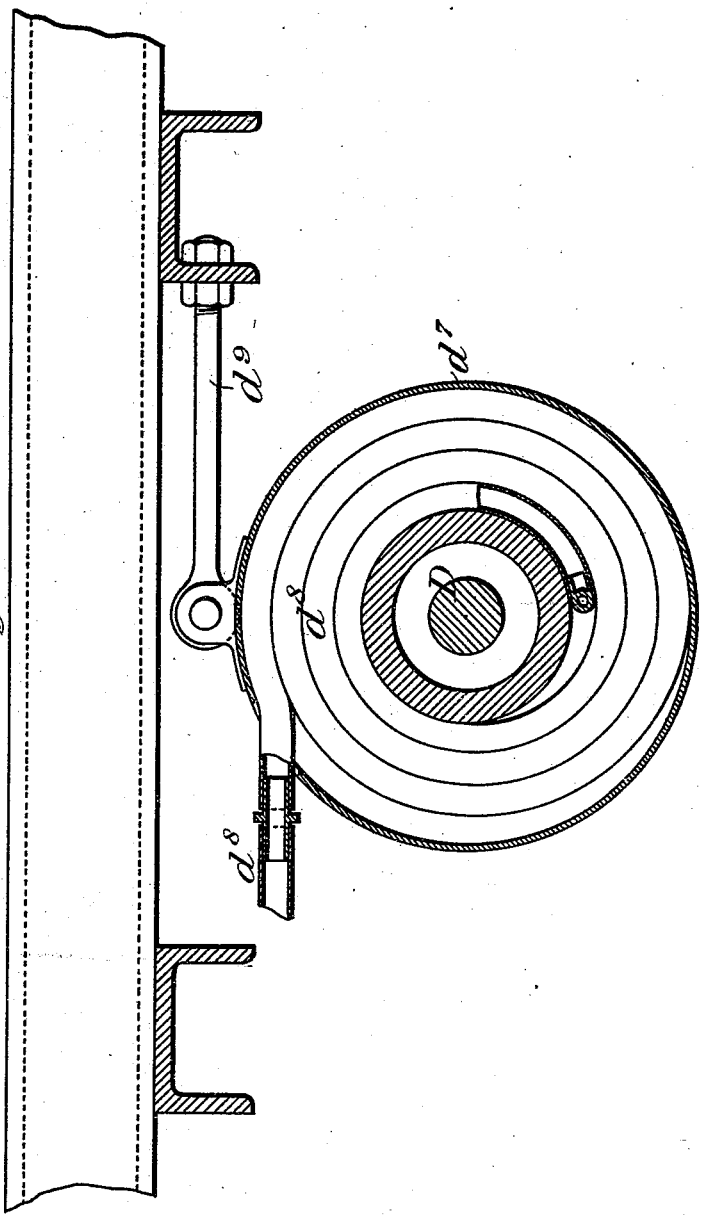

UNITED STATES PATENT OFFICE.

HENRY P. HOLT, OF LONDON, ENGLAND.

CAR PROPELLED BY GAS-MOTOR ENGINES.

SPECIFICATION forming part of Letters Patent No. 551,637, dated December 17, 1895.

Application filed August 2, 1894. Serial No. 519,312. (No model.)

*To all whom it may concern:*

Be it known that I, HENRY PERCY HOLT, a citizen of England, residing at 22 Chancery Lane, London, in the county of London, England, have invented certain new and useful Improvements in Gas-Traction Cars, of which the following is a specification.

My invention relates to the construction and arrangement of a car driven by a gas-motor engine, and its engine and driving-gear, as I shall describe, referring to the accompanying drawings.

Figure 1 is a side view. Fig. 2 is an end view, and Fig. 3 is a transverse section, of a gas-traction car according to my invention. Fig. 4 is a plan below the floor, and Fig. 5 is a part plan showing the cooling-pipes and brake connections. Fig. 6 is a plan partly in section. Fig. 7 is a longitudinal section, and Fig. 8 is a transverse section on the line Z Z of Fig. 7 of the gear for stopping and varying speed.

A A A are reservoirs of compressed gas which may at first be charged up to a pressure of eight or ten atmospheres. They communicate through reducing-valves $a$, such as are used for train-lighting by compressed gas with subsidiary reservoirs $a'$, whence, as will hereinafter be described, pipes $k^3$ lead to clutches and a brake-cylinder worked by the gas-pressure. The gas discharged from these, as well as such other gas as may be required, supplied from another reducing-valve $a^2$, passes by pipes $k^4$ $h^4$ to the gas-engine cylinder B, which is placed with its axis horizontal at the one side of the car. Its piston is linked to a crank on a vertical shaft C, carrying at its lower end a horizontal fly-wheel $c$. The products of combustion discharged from the cylinder of the gas-engine B pass by a pipe $b$ to a box $b'$, in which there are a number of perforated partitions. The products, in passing through these partitions and through perforations in the bottom of the box escape without noise, and being discharged on the roadway below the car cause no offence to passengers. The water which surrounds the engine-cylinder circulates through pipes $b^2$ arranged under one of the seats, thus becoming cooled before returning to the cylinder jacket. On the fly-wheel $c$ is a bevel-wheel $c'$, gearing with a bevel-wheel $d$ on a horizontal counter-shaft D. On this shaft are fitted free to revolve a toothed wheel $d'$ and a smaller toothed wheel $d^2$. (See Fig. 7.) On the boss of each of the wheels $d'$ and $d^2$ are keyed plates $d^3$ free to slide, and between these and the back of each wheel are interposed other plates $d^4$, which are fixed to the rims of disks $d^5$, sliding on keys on bosses $d^6$ keyed on the shaft D. Between each disk $d^5$ and the flange of the boss $d^6$ and separated from them by balls, as in a ball-bearing, there is a pair of disks $d^7$, having between them a coil of flexible pipe $d^8$. The disks $d^7$ are prevented from revolving by a link $d^9$ attached to part of the framing. (See Fig. 8.)

When it is desired to cause either of the wheels $d'$ $d^2$ to revolve with the shaft D, then by means of a valve the one or the other coil $d^8$ is put in communication with gas under moderate pressure, such as one atmosphere from the reservoir $a'$. This pressure causes the flexible pipe $d^8$ to expand so as to press firmly together the plates $d^3$ $d^4$, the wheel $d'$ or $d^2$, and the disks $d^5$, thus producing friction sufficient to drive the wheel $d'$ or $d^2$. These wheels gear with other wheels $d^{10}$ $d^{11}$ (see Fig. 6) on each of two counter-shafts $D'$ on which are fixed sprocket-wheels $d^{12}$ connected by chains with sprocket-wheels $d^{13}$ on the axles of the car. Obviously instead of chains and sprocket-wheels, gearing of any suitable known forms may be employed.

As either of the wheels $d'$ $d^2$ can be driven as described from the counter-shaft D and as they and the wheels $d^{10}$ $d^{11}$ with which they gear are of different sizes, so, while the engine works at constant speed, the car can be driven at either of two speeds.

The one or the other of the clutches is engaged or both are disengaged by the driver or conductor operating valves K connected to their coils by pipes $k'$ $k^2$ and connected by discharge-pipes to the engine-cylinder B. For operating these valves there is at each end of the car a platform, so that whichever way the car is running the driver or conductor standing on the platform which is in front has one of these valves in reach of his hand, also a lever or rod (not shown) connected to the slide-valve of the brake-cylinder H, which is supplied by a pipe $a^\times$ and is described in the specification of brake apparatus for traction-cars accompanying an application of even date with the present. The valves K may be slide-valves of ordinary construction governing parts by which either of the pipes $k'$ $k^2$ is put in communication with either the supply-pipe $k^3$ or the discharge or exhaust pipe $k^4$. The pipe $k^4$ at the one end of the car goes directly to the engine-cylinder B. The pipe $k^4$ at the other end goes to the bottom of the brake-cylinder H, from which a pipe $h^4$ passes to the engine-cylinder B. As the discharge by the pipes $k^4$ and $h^4$ is not continuous, the supply of gas to the engine-cylinder is supplemented through a reducing-valve $a^2$ at a pressure as low as that of the gas in the pipes $k^4$ and $h^4$.

Having now described the nature of my said invention and the best means I know for carrying the same into effect, I claim—

1. In a gas traction car, the combination with the gas engine B, of a vertical crank shaft C linked to the piston rod of said engine, a horizontal fly wheel mounted upon the lower end of the crank shaft, a bevel gear carried by the fly wheel, a counter shaft D carrying a bevel gear $d$ which meshes with the gear on the fly wheel, toothed wheels loosely mounted upon the counter shaft, clutch disks carried by said latter named shaft, and adapted to rigidly hold the toothed wheels thereto, and gearing connecting the toothed wheels with the driving wheels of the car, substantially as described.

2. In a gas traction car, the combination with the gas engine B, of a vertical crank shaft C carrying a fly wheel at its lower end and linked to the piston rod of the engine, a counter shaft D geared to the crank shaft, a pair of toothed wheels of different diameters loosely mounted upon the counter shaft, clutch disks carried by said latter named shaft by which either toothed wheel can be engaged with the same, a pair of primary sprocket-wheel shafts D' located adjacent to the counter shaft and carrying toothed wheels of different diameter which mesh with the aforesaid toothed wheels, and gearing connecting the sprocket wheels of the primary shafts with the driving wheels of the car, substantially as described.

3. In a gas traction car, the combination with the counter shaft loosely carrying one or more toothed wheels, of a pair of friction plates slidably keyed to said shaft, a coil of flexible pipe located between the plates, and means for inflating said coil of pipe whereby it is made to expand moving the plates laterally to engage with the loose wheels, substantially as described.

4. In a gas traction car, the combination with the counter shaft D, of a pair of clutch or friction plates carried by said shaft, a coil of flexible pipe located between said plates, a reservoir containing fluid under pressure, and a connection between the reservoir and coil of pipe whereby the plates will be forced apart when the fluid enters said coil from the reservoir, substantially as described.

5. In a gas traction car, the combination with a set of reservoirs containing compressed gas, of a reducing valve for each reservoir, a counter shaft carrying friction plates, a coil of expansible pipe located between said plates, a brake cylinder, an engine cylinder, and a tubular connection between the reservoirs, reducing valves, brake cylinder, and engine cylinder, substantially as described.

6. In a gas traction car the arrangement on a platform at each end of the car of a lever for moving the valve of the brake cylinder, and of a valve communicating by supply and discharge pipes with the flexible pipe coils of the two clutches.

In testimony whereof I have signed my name to this specification, in the presence of two subscribing witnesses, this 10th day of July, 1894.

HENRY P. HOLT.

Witnesses:
HAROLD IMRAY,
JNO. P. M. MILLARD.